United States Patent
Mennesson

(10) Patent No.: US 6,913,253 B2
(45) Date of Patent: Jul. 5, 2005

(54) TRAVEL LIMIT STOP DEVICE FOR A MOTOR VEHICLE DAMPER, AND METHOD FOR MAKING SAME

(75) Inventor: Dominique Mennesson, Maisons-Alfort (FR)

(73) Assignee: Peugeot Citroen Automobiles S.A., Neuilly-sur-Seine (FR)

( * ) Notice: Subject to any disclaimer, the term of this patent is extended or adjusted under 35 U.S.C. 154(b) by 0 days.

(21) Appl. No.: 10/333,332

(22) PCT Filed: Jul. 16, 2001

(86) PCT No.: PCT/FR01/02309

§ 371 (c)(1),
(2), (4) Date: May 30, 2003

(87) PCT Pub. No.: WO02/06699

PCT Pub. Date: Jan. 24, 2002

(65) Prior Publication Data
US 2004/0012136 A1 Jan. 22, 2004

(30) Foreign Application Priority Data
Jul. 17, 2000 (FR) .............................................. 00 09321
Jul. 17, 2000 (FR) .............................................. 00 09320

(51) Int. Cl.[7] .......................... B60G 15/00; B60G 15/07
(52) U.S. Cl. ............ 267/220; 188/321.11; 280/124.155
(58) Field of Search ................................. 267/202, 219, 267/220, 225; 188/321.11; 280/124.155, 124.177, 124.179, 124.147

(56) References Cited

U.S. PATENT DOCUMENTS

| | | | |
|---|---|---|---|
| 3,165,306 A | 8/1961 | Tea | 267/220 |
| 4,747,587 A | 5/1988 | Ferrel | 267/220 |
| 5,820,114 A * | 10/1998 | Tsai | 267/202 |

FOREIGN PATENT DOCUMENTS

| | | | |
|---|---|---|---|
| DE | 3619942 A | 12/1987 | |
| DE | 19803174 | 9/1998 | |
| EP | 0429405 A | 5/1991 | |
| FR | 2539836 A1 * | 7/1984 | .......... B60G/15/06 |
| FR | 2637232 A | 4/1990 | |
| FR | 2658129 A | 8/1991 | |
| GB | 2266941 A * | 11/1993 | ............. F16F/9/54 |

* cited by examiner

*Primary Examiner*—Thomas Williams
(74) *Attorney, Agent, or Firm*—Ladas & Parry LLP

(57) ABSTRACT

The present invention relates to a travel-limiting stop device for a motor-vehicle shock absorber. The device is characterized in that the compression stop (2) and the vibration-damping element (8) are disposed within the envelope of the suspension spring (14) in such a way as to limit the total length of the shock absorber (1). The invention is applicable in the motor-vehicle sector.

5 Claims, 3 Drawing Sheets

TRAVEL LIMIT STOP DEVICE FOR A MOTOR VEHICLE DAMPER, AND METHOD FOR MAKING SAME

The present invention relates to a travel-limiting device for a motor vehicle as well as to a process for making such a device.

A suspension of a motor vehicle is generally composed of a suspension spring serving to support the suspended mass of the vehicle, of a shock absorber to cushion the relative displacements between the suspended mass and the non-suspended mass of the vehicle, and of two stops that are usually provided with an elastic compression element associated with the shock absorber, in order to limit the amplitude of the relative displacements between the suspended mass and the non-suspended mass, both in compression and relaxation.

In the case of a suspension in which the shock-absorber leg is connected to the vehicle chassis while the cylinder comprising the shock-absorber body is connected to a wheel-spindle support, which can have the form of a suspension arm, the stop is interposed between the vehicle chassis and the shock-absorber body, being compressed, along the shock-absorber leg and coaxially therewith, between a transverse bracing wall, which is integral with the shock-absorber body at the upper end thereof, and an expansion bowl, which is connected to the fixation of the shock-absorber leg to the vehicle body.

According to this known arrangement, the stop is disposed directly in the assembly of the shock absorber, increasing its idle dimensions by the value of the length of the completely compressed stop plus the thickness of the bracing wall of the stop. This bracing wall must be provided in addition with ducts for evacuation of the air expelled by the compression of the stop, in order to prevent air or foreign particles from entering the shock absorber under pressure via the means that seal the leg relative to the cylinder of the shock absorber.

The purpose of the present invention is to alleviate the aforesaid disadvantages by proposing, for a motor-vehicle shock absorber, a travel-limiting device, which is designed such that the compression stop is no longer a part of the idle dimensions of the shock absorber, thus permitting a substantial improvement of the capacity of the front or rear axle system of a vehicle provided with such a device, and in which the risks of accumulation of particles between the stop, the shock-absorber leg and the shock-absorber body are considerably reduced.

The object of the invention is therefore a travel-limiting device for a motor-vehicle shock absorber, the said device comprising a stop provided with an elastic compression element, which is interposed, coaxially with the shock-absorber leg, between the vehicle chassis, to which there is connected the shock-absorber leg, and the shock-absorber body, which is connected to a wheel-spindle support, or between the shock-absorber body, which is connected to the chassis, and the wheel-spindle support, to which there is connected the shock-absorber leg, a suspension spring that surrounds the shock-absorber body being provided between the chassis and the said body, characterized in that the compression element, which has cylindrical general shape, extends at least partly around the shock-absorber body while being maintained in preloaded condition relative to the shock-absorber body, in that an elastomeric vibration-damping element of cylindrical general shape is made integral with the end of the shock-absorber leg, and in that the compression element and the damping element are completely housed within the envelope of the suspension spring, the damping element being situated in an annular zone that is an extension of the annular zone in which the compression element is located.

Preferably, the end of the shock-absorber leg is also situated within the envelope of the suspension spring.

According to a first embodiment, the compression stop is disposed around the shock-absorber body in a bowl integral with this body, and is maintained in preloaded condition in the bowl by a mount connected to the chassis or to the wheel support.

Preferably, the housing bowl of the compression stop has two concentric walls, the outer wall and inner wall respectively, joined to one another by a transverse annular wall for bracing the compression stop, in such a way as to define approximately, in longitudinal section, a U-shaped structure, the inner wall of the bowl being integral with the corresponding lateral surface of the shock-absorber body.

In the case in which the compression stop is interposed between the vehicle chassis and the shock-absorber body, the preloading mount of the stop is integral with a suspension support fixed to the vehicle body, the suspension support being the bracing means of one end of a suspension spring, whose opposite end is braced on a flange ring integral with the shock-absorber body.

The active end of the stop braced on the mount has an annular shape extending in the form of a wedge.

According to a second embodiment, the compression element is mounted on a support connected to the vehicle chassis, the stop being maintained in preloaded condition on the support by a bracing element connected to the shock-absorber body or to the shock-absorber leg.

The travel-limiting device according to the invention can also be provided with one or more of the following characteristics, taken individually or in all technically possible combinations:

- the compression element is provided with one end braced on the said bracing element and the opposite end mounted by complementarity of shape on a skirt, which is fixed on a receiving channel for the end of the shock-absorber suspension spring, whose opposite end is braced on a flange ring integral with the body or with the leg;
- the compression element is provided with a peripheral bead, which projects radially outward and which is engaged in a complementary recess formed in the wall of the skirt;
- the compression element is provided with a generally cylindrical part, one end of which is braced on the said bracing element and the opposite end of which is extended by a flared part, whose free end defines a substantially annular shoulder which is mounted in a receiving channel for the end of the shock-absorber suspension spring, whose other end is braced on a flange ring integral with the body or with the leg;
- the said bracing element is provided with two mutually opposite annular end shoulders, one braced on the flange ring and the other receiving the compression element, and a middle part forming a spacer.

Another object of the invention is a process for making a travel-limiting device such as defined in the second embodiment hereinabove, characterized in that it includes the steps of molding the compression element, mounting the support on the compression element and forming a vibration-damping block, via which the compression element is mounted on the shock-absorber leg, and in that the compression element and the damping block are formed simultaneously by molding, a mounting bushing of the compression element being made integral with the compression element during the molding.

The invention will be better understood and other purposes, characteristics, details and advantages thereof will become clearer from the explanatory description given hereinafter with reference to the attached drawings presented exclusively as examples illustrating three embodiments of the invention, and in which:

FIG. 1 illustrates device 1 with travel-limiting stop 2 according to a first embodiment of the invention.

Device 1 is intended for a motor-vehicle shock absorber 3, comprising a cylindrical shock-absorber body 4 and a shock-absorber leg 5 mounted slidingly in shock-absorber body 4.

Figure 1:
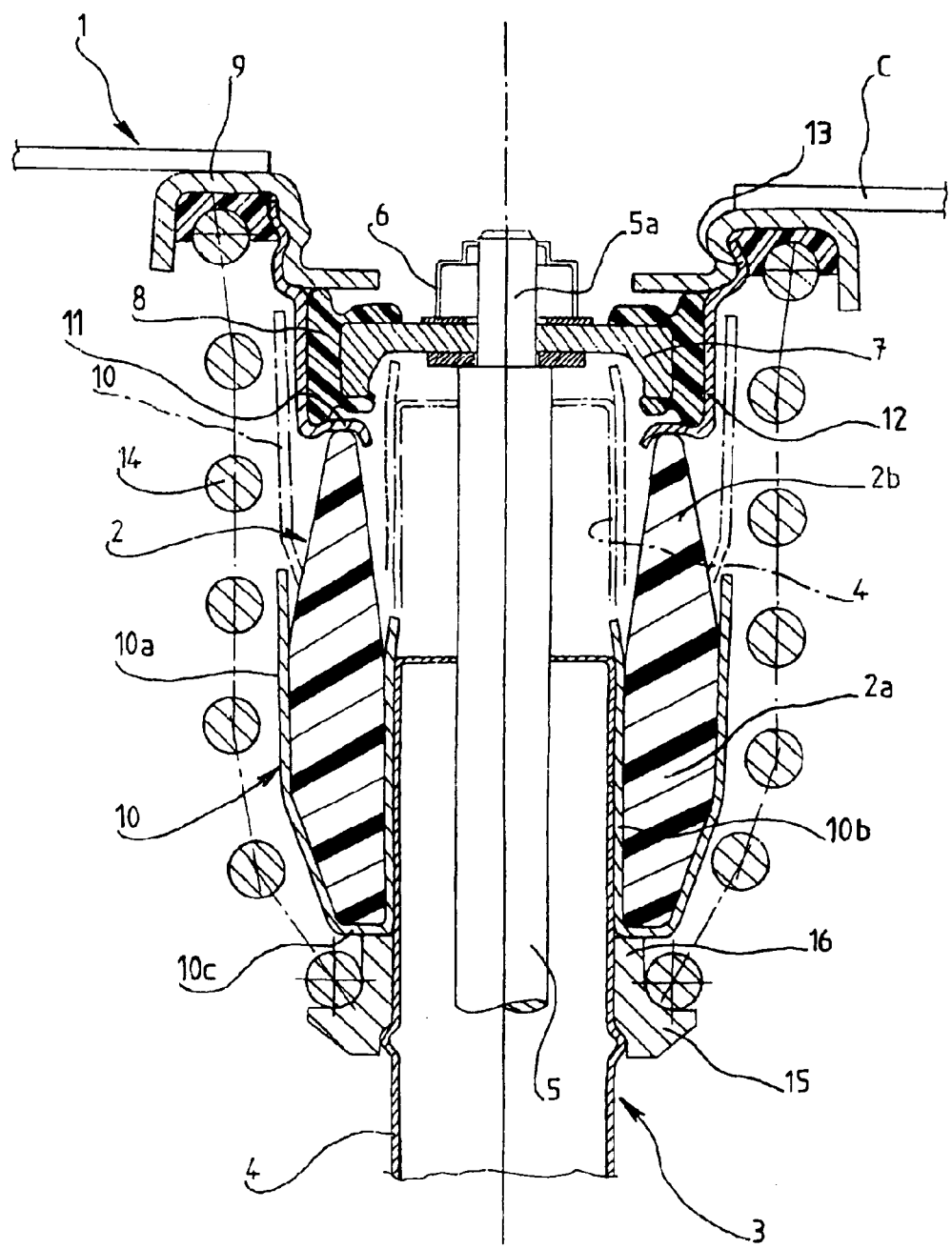
FIG. 1 illustrates, in a partial view in longitudinal section, a travel-limiting stop device, according to a first embodiment of the invention, for a motor-vehicle shock absorber.

The embodiment illustrated in FIG. 1 relates to the case in which shock-absorber body 4 is connected at its lower part (not illustrated) to the wheel-spindle support, while shock-absorber leg 5 is connected at its upper end to vehicle body C.

One part of shock-absorber leg 5 extends out of body 4 and is terminated at the upper end by a threaded part 5a, which has smaller diameter and is integral with vehicle body C, to which there is fixed, by means of a nut 6, a mount 7, a vibration-damping elastomeric element 8 and a suspension support 9.

Stop 2 comprises a single piece and is composed of an elastic compression element of elastomeric material having the form of a sleeve mounted in a bowl 10 integral with body 4, the sleeve being disposed around body 4 of shock absorber 3 and being coaxial with shock-absorber leg 5.

More precisely, the sleeve comprising compression stop 2 has a lower part 2a, whose cylindrical inner lateral surface surrounds shock-absorber body 4 and whose outer lateral surface is provided with a downwardly tapering frustoconical lower portion extended by a cylindrical upper portion. Upper part 2b of compression stop 2 is provided with an upwardly flaring frustoconical inner lateral surface spaced at a certain distance from shock-absorber leg 5 and an upwardly tapering frustoconical outer lateral surface. The wedge-shaped active annular upper end of part 2b of compression stop 2 is maintained in braced relationship on a rigid mount 11 connected to the vehicle body via suspension support 9. Mount 11 exerts on compression stop 2 a compressive force directed parallel to the axis of shock-absorber leg 5. This mount is joined to a skirt 12 extended in the upper part by a wall 13 integral with channel-shaped support 9, which serves as bracing means for the end of a suspension spring 14, whose lower opposite end is braced on a flange ring 15 integral with shock-absorber body 4. Elastic connecting block 8 comprising the damping element is fixed by adherization to the periphery of mount 7 and to the inner cylindrical surface of skirt 12.

Housing bowl 10 of compression stop 2 has two concentric walls, outer wall 10a and inner wall 10b respectively, joined to one another in the lower part by a transverse annular wall 10c serving as bracing means for compression stop 2. The two walls 10a, 10b are formed in such a way that they define, in longitudinal or vertical section, a generally U-shaped structure. More precisely, inner wall 10b is cylindrical and surrounds the cylindrical upper part of shock-absorber body 4, with which it is in close contact by the fact that it is made integral therewith by, for example, a force fit, wall 10c being stopped on a cylindrical bushing 16 integral with shock-absorber body 4. As illustrated, bracing bushing 16 is formed in a single piece with flange ring 15. Outer wall 10a of bowl 10 has a shape matching that of the outer surface of lower part 2a of compression stop 2, meaning that it is provided with a portion having a cylindrical upper wall.

FIG. 1 illustrates, in dot-dash lines, the position of bowl 10 when stop 2 is compressed to the maximum extent during a vertical upward displacement of the wheel, in order to absorb energy and to prevent a violent jolt.

Furthermore, stop 2 and damping block 8 are situated respectively in two annular zones, one extending from the other and both being concentric with shock-absorber body 4, thus ensuring that the transverse dimensions of the invention can be reduced. In addition, stop 2 and damping block 8 are housed within the envelope of suspension spring 14, as is end 5a of shock-absorber leg 5, thus limiting the total length of the shock absorber.

Of course, the invention is also applicable to the arrangement in which the shock-absorber body is integral, in its upper part, with the vehicle chassis or body and the downwardly directed leg is integral with the corresponding wheel support. In this case, mount 11 for compression of stop 2 will be integral with the wheel support.

The travel-limiting stop device described hereinabove has the following advantages:

The compression stop is no longer part of the idle dimensions of the shock absorber, thus permitting a substantial improvement in the compactness of the axle system provided with such a stop;

Improvement of the decoupling between shock absorption and compression stop by suppression of the friction—which used to occur when the stop was mounted coaxially around and along the leg—of the leg on the stop during the compression phase, thus resulting in reduced noise transmission; and The damping of the shock absorber is no longer adversely influenced by the forces of the compression stop, thus resulting in a reduction in its dimensions, permitting its insulation performances to be improved and its space requirements and costs to be reduced.

Figure 2:
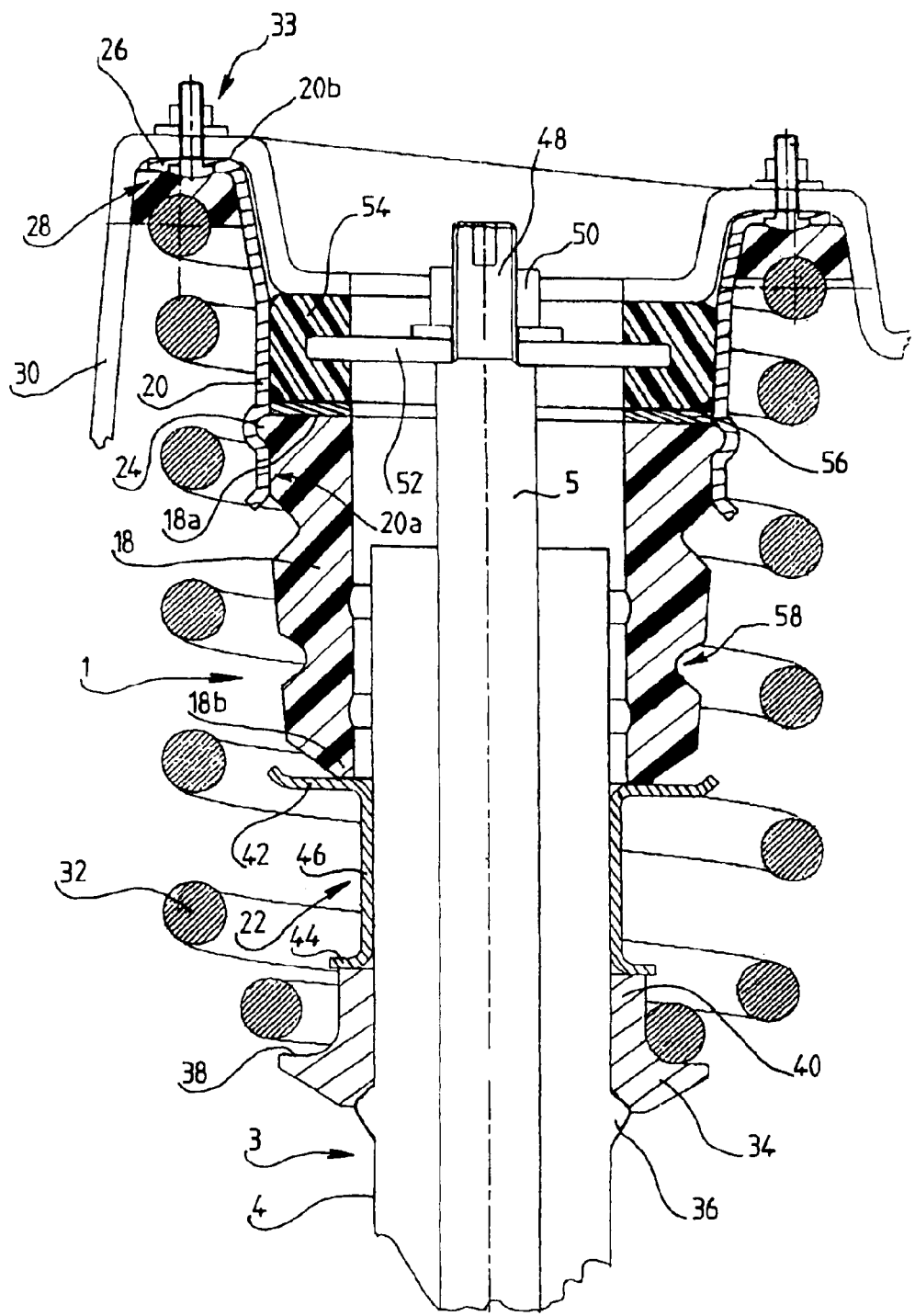
FIG. 2 is a partial view in longitudinal section of a travel-limiting device, according to a second embodiment of the invention, for a motor-vehicle shock absorber.

FIG. 2 illustrates a second embodiment of the travel-limiting device according to the invention, denoted by the general numerical reference 1 and illustrated in a supposedly vertical position.

As for the first embodiment, it is intended to comprise an element of a motor-vehicle suspension. To achieve this, it is associated with a shock absorber 3 of the vehicle, provided with a cylindrical shock-absorber body 4 and a shock-absorber leg 5 mounted slidingly in body 4.

The shock absorber is intended to be mounted between the suspended mass of the vehicle, such as the mass of the chassis, and the non-suspended mass, such as the mass of the wheel-spindle support.

To this end, shock-absorber leg 5 can either be connected to the vehicle chassis, while the shock-absorber body is connected to the wheel-spindle support, or it can be connected to the wheel-spindle support, while the shock-absorber body is connected to the vehicle chassis.

Figure 3:
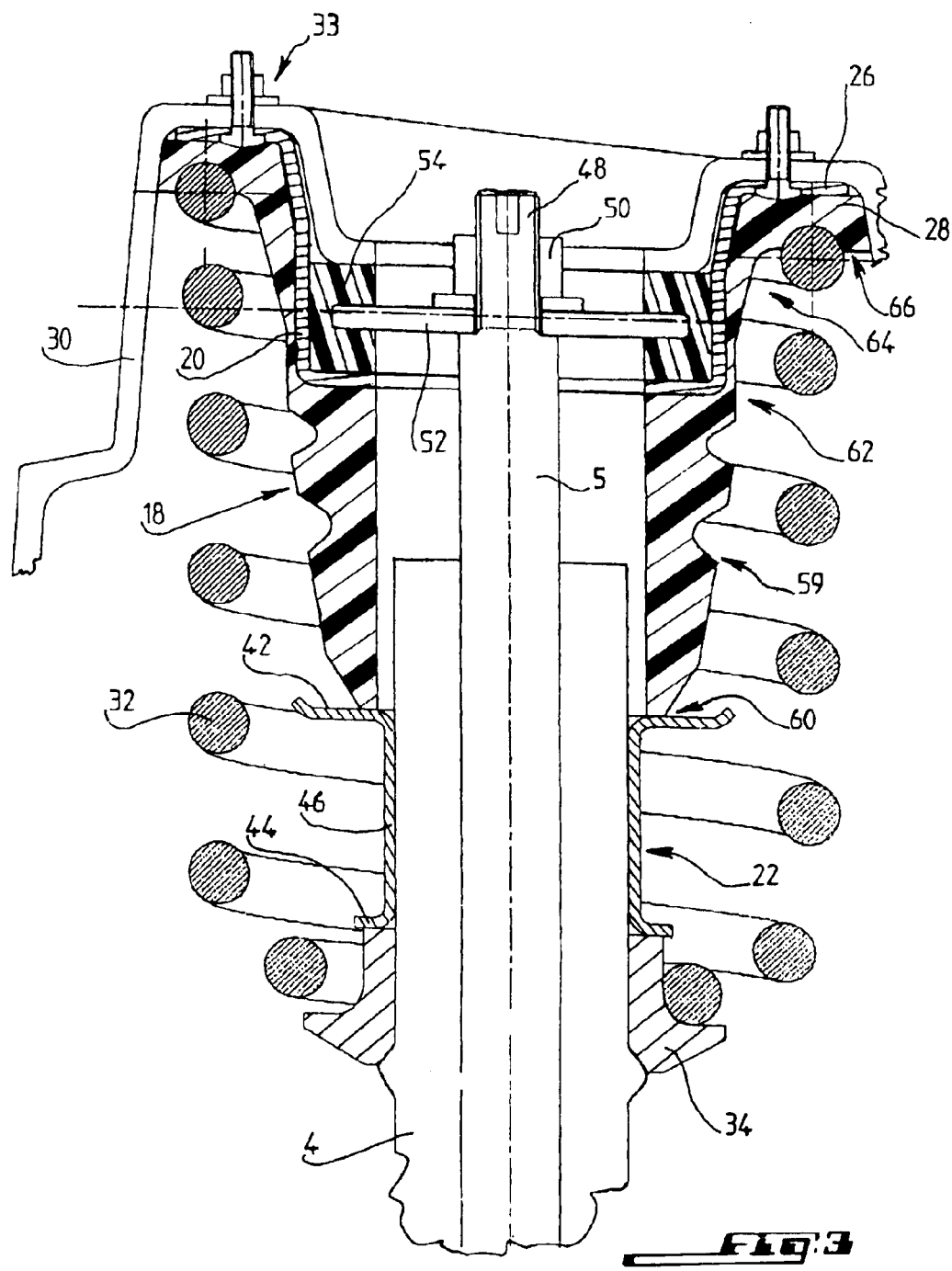
FIG. 3 is a partial view in longitudinal section of another embodiment, according to the invention, of a travel-limiting device for a motor vehicle.

Both the embodiment illustrated in FIG. 2 and that of FIG. 3 relate to the case in which shock-absorber body 4 is connected via its lower part (not illustrated) to the wheel-spindle support, while shock-absorber leg 5 is connected via its upper end to the vehicle body (not illustrated).

The travel-limiting device is composed mainly of a stop 18 formed by an elastic compression element made of an elastomeric material that is appropriate for the envisioned use.

This compression element 18 has cylindrical general shape and is mounted at least partly around shock-absorber body 4, such that it is coaxial with shock-absorber leg 5.

More particularly, as is visible in FIG. 2, compression element 18 is provided with a first end 18a, or upper end, mounted by complementarity of shape on a skirt 20 connected to the vehicle chassis, and with an opposite end 18b, or lower end, braced on a bracing element 22, arranged in such a way as to maintain compression element 18 in preloaded condition.

First end 18a of compression element 18 is provided with an annular peripheral bead 24, which projects radially outward and engages in a corresponding annular recess provided in the constituent wall of skirt 20.

This skirt 20 is generally cylindrical and is provided with a first, lower end zone 20a, in which there is formed the recess that supports, by complementarity of shape, compression element 18, and with an upper, opposite end zone 20b, provided with a substantially annular shoulder 26, which is engaged in the bottom of an annular recess formed by a receiving channel 30 for the first end of a suspension spring 32 of shock absorber 3.

Annular shoulder 26 of skirt 20 is made integral with channel 30 by means of fastening means of the nut-and-bolt type, such as 33.

Furthermore, shock absorber 3 is provided with a flange ring 34 braced on a peripheral bead 36 formed on the outer peripheral surface of shock-absorber body 4.

This flange ring 34 is provided with an upper surface defining a seat 38, on which there rests a second end of suspension spring 32.

The flange ring is also provided with an axial cylindrical extension 40, which extends upward from seat 38 and whose upper end face supports bracing element 22 for compression element 18, which comprises the stop.

As is evident in FIG. 2, this bracing element comprises a sleeve that surrounds shock-absorber body 4 and is provided with two annular end shoulders 42 and 44, which respectively represent a bracing surface for compression element 18 and a foot by which it rests on flange ring 34, and with a middle part 46 forming a spacer.

Furthermore, shock-absorber leg 5 is provided with a part that extends out of body 4 of shock absorber 3 and that is terminated at its upper end by a threaded zone 48 which has smaller diameter and is integral with the vehicle body, and to which there is fixed by means of a nut 50, an annular bushing 52. The peripheral zone of this bushing is inserted in a groove machined in the inside face of an elastomeric vibration-damping block 54, which is placed in a volume defined at the top by channel 30, at the sides by skirt 20 and at the bottom by separating wall 56 welded to skirt 20.

Lastly in FIG. 2 it is seen that compression element 18 is provided with outer and inner peripheral grooves, such as 58, to permit control of the longitudinal deformation of this element.

As for the first embodiment, stop 18, damping block 54 and end 48 of shock-absorber leg 5 are housed within the envelope of suspension spring 32. In addition, stop 18 and block 54 are situated respectively in two annular zones concentric with shock-absorber body 4, with one extending from the other. In this way the total length of the shock absorber and also its transverse dimensions are limited.

As is intended, when the vehicle wheel is subjected to a maximum vertical upward displacement, the travel-limiting stop adopts a configuration in which it is compressed to the maximum extent. In doing so, it absorbs the energy that in its absence would be transmitted to the vehicle passengers, who would then experience a violent jolt.

The travel-limiting device of this second embodiment has the following advantages:

- the compensation stop is no longer part of the idle dimensions of the shock absorber, thus permitting a substantial improvement in the compactness of the axle system provided with such a stop;
- Improvement of the decoupling between shock absorption and compression stop by suppression of the friction—which used to occur when the stop was mounted coaxially around and along the leg—of the leg on the stop during the compression phase, thus resulting in reduced noise transmission; and
- The damping of the shock absorber is no longer adversely influenced by the forces of the compression stop, thus resulting in a reduction in its dimensions, permitting its insulation performances to be improved and its space requirements and costs to be reduced.
- the positioning of the stop such that it is braced on an element forming a spacer permits this stop to adopt a high position, thus preventing the risks of accumulation of particles between the stop, the shock-absorber leg and the shock-absorber body.

It will be noted, however, that the invention is not limited to the described second embodiment.

In fact, according to this embodiment described hereinabove with reference to FIG. 2, the stop is mounted on a skirt fixed to a channel in which one of the ends of the suspension spring is received.

As illustrated in the embodiment of FIG. 2, it is also possible to form stop 18 in such a way that it is provided with a first part 59 of cylindrical general form, whose lower free end 60 is braced on bracing element 22 and whose upper, opposite end 62 is extended by a flared part 64, the free end of which defines a substantially annular shoulder 66, which is mounted in channel 28 and is pressed between annular part 26 of skirt 20 and the corresponding end of suspension spring 32. Furthermore, according to this embodiment, the separating wall serving to define the receiving housing for elastomeric block 54 can be integrated with the constituent wall of skirt 20.

To make such a device, it is appropriate to form compression element 18 for example by molding, to mount skirt 20 on the compression element and to make the vibration-damping block via which the compression element is mounted on the shock-absorber leg.

Preferably, the compression element and the damping block are made simultaneously by molding of an elastomer. In this case, bushing 52 is embedded during the molding.

It is evident from the foregoing that this third embodiment additionally ensures that production of the travel-limiting device can be achieved more economically, inasmuch as the number of pieces of which it is composed is reduced.

As for the two foregoing embodiments, stop 18, block 54 and end 48 of the shock-absorber leg are for practical purposes disposed within the envelope of suspension spring 32, thus limiting the total length of the shock absorber. In addition, stop 18 and block 54 situated above the stop are disposed respectively in two annular zones, which are concentric with shock-absorber body 4, with one extending from the other.

What is claimed is:

1. A travel-limiting device for a motor-vehicle shock absorber (3), the said device comprising a stop (2) provided with an elastic compression element, which is interposed, coaxially with the leg (5) of the shock absorber (3), between the vehicle chassis, to which there is connected the shock-absorber leg (5), and the shock-absorber body (4), which is connected to the chassis, and the wheel-spindle support, to which there is connected the shock-absorber leg (5), a suspension spring (14) being provided between the chassis and the shock-absorber body (4) concentric with the latter, wherein the compression element (2) extends at least partly around the shock-absorber body (4) while being maintained in preloaded condition relative to the shock-absorber body (4), an elastomeric vibration-damping element (8) of cylindrical general shape is made integral with the end of the shock-absorber leg (5), and the compression element (2), the damping element (8) and the end of the shock-absorber leg (5) are completely housed within the suspension spring (14), the damping element (8) and the compression element are situated in two annular zones, respectively, one extending from the other and both being concentric with shock-absorber body (4) to reduce the transverse dimensions of the damping and compression elements (8; 2), wherein the compression element (2) is disposed around the body (4) of the shock-absorber (3) in a bowl (10) integral with this body, and is maintained in preloaded condition in the bowl (10) by a mount (11) connected to the chassis (C) or to the wheel support, and wherein the housing bowl (10) of the compression stop (2) has two concentric walls, the outer wall (10a) and the inner wall (10b) respectively, joined to one another by a transverse annular wall (10c) for bracing the compression stop (2), in such a way as to define approximately, in longitudinal section, a U-shaped structure, the inner wall (10b) of the bowl (10) being integral with the corresponding lateral surface of the body (4) of the shock absorber (3).

2. A device according to claim 1, characterized in that the elastomeric element (8) is fixed by adherization on the one hand to the outer periphery of a mount (7) integral with the end (5a) of the shock-absorber leg (5), and on the other hand to the inner cylindrical surface of a skirt (12) integral with a channel-shaped support (9) serving as bracing means for the suspension spring (14).

3. A device according to claim 1, characterized in that, when the compression element (2) is interposed between the vehicle chassis (C) and the body (4) of the shock absorber (3), the preloading mount (11) of the stop (2) is integral with a suspension support (9) fixed to the vehicle body (C), the suspension support (9) being the bracing means of one end of the suspension spring (14), whose opposite end is braced on a flange ring (15) integral with the body (4) of the shock-absorber (3).

4. A device according to claim 1, characterized in that the active end (2b) of the compression element (2) braced on the mount (11) has an annular shape extended in the form of a wedge.

5. A travel-limiting device for a motor-vehicle shock absorber (3), the said device comprising a stop (2) provided with an elastic compression element, which is interposed, coaxially with the leg (5) of the shock-absorber (3), between the vehicle chassis, to which there is connected the shock-absorber leg (5), and the shock-absorber body (4), which is connected to a wheel-spindle support, or between the shock-absorber body (4), which is connected to the chassis, and the wheel-spindle support, to which there is connected the shock-absorber leg (5), a suspension spring (14) being provided between the chassis and the shock-absorber body (4) concentric with the latter, wherein the compression element (2) extends at least partly around the shock-absorber body (4) while being maintained in preloaded condition relative to the shock-absorber body (4), an elastomeric vibration-damping element (8) of cylindrical general shape is made integral with the end of the shock-absorber leg (5), and the compression element (2), the damping element (8), and the end of the shock-absorber leg (5) are completely housed within the suspension spring (14), the damping element (8) and the compression element are situated in two annular zones, respectively, one extending from the other and both being concentric with shock-absorber body (4) to reduce the transverse dimensions of the damping and compression elements (8; 2), wherein the compression element (2) is disposed around the body (4) of the shock-absorber (3) in a bowl (10) integral with this body, and is maintained in preloaded condition in the bowl (10) by a mount (11) connected to the chassis (C) or to the wheel support, the housing bowl (10) of the compression stop (2) has two concentric walls, the outer wall (10a) and the inner wall (10b) respectively, joined to one another by a transverse annular wall (10c) for bracing the compression stop (2), in such a way as to define approximately, in longitudinal section, a U-shaped structure, the inner wall (10b) of the bowl (10) being integral with the corresponding lateral surface of the body (4) of the shock-absorber (3), and wherein the active end (2b) of the stop (2) braced on the mount (11) an annular shape extended in the form of a wedge.

* * * * *